UNITED STATES PATENT OFFICE.

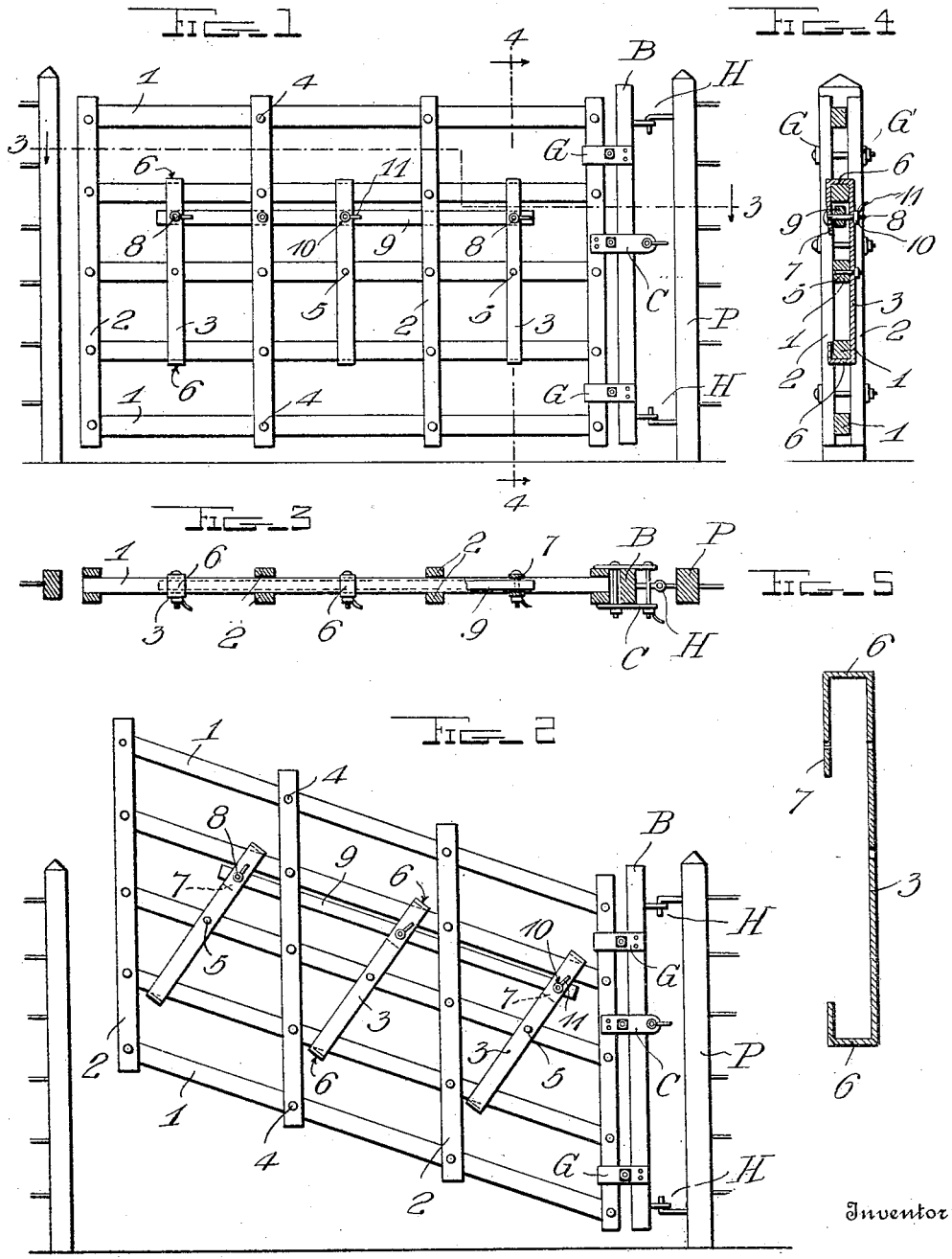

RANDALL T. VAN VALKENBURG, OF WASHINGTON, DISTRICT OF COLUMBIA.

GATE.

1,110,168.　　　　Specification of Letters Patent.　　Patented Sept. 8, 1914.

Application filed November 28, 1913. Serial No. 803,535.

*To all whom it may concern:*

Be it known that I, RANDALL T. VAN VALKENBURG, a citizen of the United States, residing at Washington, in the District of Columbia, have invented certain new and useful Improvements in Gates; and I do declare the following to be a full, clear, and exact description of the invention, such as will enable others skilled in the art to which it appertains to make and use the same.

This invention relates to improvements in gates and particularly to those employing parallel longitudinal and vertical bars pivoted together to allow the gate to have a parallelogrammatic movement, pivoted brace bars being employed for retaining the gate in any of its adjusted positions.

I am aware that numerous gates of this character have heretofore been placed on the market but the majority of them are rendered absolutely inoperative in cold weather when the gate is covered with frozen snow or ice.

The primary object of this invention is to overcome the above objections to gates of this character and to this end the invention resides in certain novel features of construction herein described and claimed and shown in the drawings wherein:—

Figure 1 is a front elevation of a gate constructed in accordance with my invention and showing the same in a horizontal position; Fig. 2 is a similar view showing the gate in one of its adjusted positions; Fig. 3 is a horizontal section on the line 3—3 of Fig. 1; Fig. 4 is a vertical section on the line 4—4 of Fig. 1; and Fig. 5 is a vertical sectional view of one of the pivoted brace bars for retaining the gate in adjusted position.

In the embodiment illustrated in the accompanying drawings, I have shown a gate composed of a plurality of parallel longitudinal bars 1, vertical cross bars 2 pivoted to said longitudinal bars, and a plurality of pivoted brace bars 3 for retaining the gate in adjusted position. The rear cross bars 2 are loosely engaged with guides G carried by a vertical bar B which is hingedly connected at H to one of the gate posts P, said end bars 2 being provided with a clamp C for securing said bars and in fact, the entire gate in a vertically adjusted position. It will be clearly seen by reference to the various figures of the drawings that the vertical cross bars 2 are disposed on the opposite sides of the longitudinal bars 1 and pivot bolts 4 pass through the bars 2 and the intervening bars 1. It will also be noted that I have shown four sets of the vertical bars 2 and that the brace bars 3 are pivoted at points 5 centrally located between the various bars 2 and that the inner sides of the brace bars 3 are in contact with one face of the central longitudinal bar above mentioned.

The brace bars 3 are preferably formed of metal having their upper and lower ends bent substantially upon themselves to provide lateral gripping members 6 which contact with the upper and lower faces of certain of the bars 1. The free ends 7 at the upper ends of the bars 3 depend parallel with said bars 3 and contact with the side of the bars 1 opposite the side with which said bars 3 are in contact. These free ends 7 also depend a considerable distance below the longitudinal bars 1 and clamping bolts 8 are passed through the free ends 7, the bars 3, and an intervening connecting rod 9 and said bolts are provided with nuts 10 having operating handles 11. As clearly shown in Fig. 4, the lower ends of the bars 3, after being bent to form the lower gripping members 6, extend upwardly and terminate even with the upper edge of the bar 1 around which they are bent.

The brace bars 3 are preferably rectangular in cross section thus providing biting edges on the opposite corners of the members 6 which, when the nuts 10 are loosened and the forward end of the gate raised, may be forced to bite into the bars 1 so as to securely hold the gate in adjusted position. The nuts 10 may then be again tightened and the gate will thus be locked in this position.

By the above described structure, it will be clearly seen that the biting edges of the members 6 will effectually bite into any frozen snow or ice which may have accumulated on the bars 1 and will hold the gate in adjusted position in spite of these undesirable conditions.

Although I have described my invention with considerable minuteness, I do not wish to be limited to details other than those amplified in the appended claim, it being evident that numerous minor changes might be made under the scope of said claim. As illustrative of this, I may form the brace bars of wood and secure gripping members, having the same effect as the members 6, to them in any suitable manner.

Having thus described my invention, what I claim and desire to secure by Letters Patent is:

A gate comprising longitudinal parallel bars, vertical bars pivoted thereto, flat metal brace bars centrally pivoted to one of said longitudinal bars and having their upper and lower ends bent substantially upon themselves and hooked over certain of said longitudinal bars, a connecting rod between the parallel portions of one bent end of said brace bar, a bolt passing through said parallel portions and the intervening connecting rod and a nut on said bolt for drawing said parallel portions into binding contact with the opposite sides of the said longitudinal bars.

In testimony whereof I have hereunto set my hand in presence of two subscribing witnesses.

RANDALL T. VAN VALKENBURG.

Witnesses:
CARL GIOVANNETTI,
J. A. GRIESBAUER.

Copies of this patent may be obtained for five cents each, by addressing the "Commissioner of Patents, Washington, D. C."